US008398328B2

(12) United States Patent
Marc et al.

(10) Patent No.: US 8,398,328 B2
(45) Date of Patent: Mar. 19, 2013

(54) COUPLING ARRANGEMENT AND CONNECTION ASSEMBLY

(75) Inventors: Daniel Marc, Leghorn (IT); Roberto Ricci, Leghorn (IT)

(73) Assignee: Continental Automotive GmbH, Hannover (DE)

( * ) Notice: Subject to any disclaimer, the term of this patent is extended or adjusted under 35 U.S.C. 154(b) by 282 days.

(21) Appl. No.: 12/348,922

(22) Filed: Jan. 6, 2009

(65) Prior Publication Data

US 2009/0196687 A1 Aug. 6, 2009

(30) Foreign Application Priority Data

Jan. 7, 2008 (EP) .................................... 08000179

(51) Int. Cl.
*F16B 7/10* (2006.01)
*F02M 69/46* (2006.01)
*F02M 61/14* (2006.01)

(52) U.S. Cl. ......... 403/166; 403/341; 123/456; 123/470

(58) Field of Classification Search .................. 403/166, 403/229, 325, 341, 365; 123/447, 456, 468, 123/469, 470; 239/533.2–533.12, 583–585.5, 239/600; 138/30
See application file for complete search history.

(56) References Cited

U.S. PATENT DOCUMENTS 1,944,255 A * 1/1934 McFall et al. ................ 279/2.15
2,892,608 A * 6/1959 Collins ........................ 251/61.4
3,412,718 A * 11/1968 Long ............................ 123/468
4,575,008 A * 3/1986 Kaczynski ................. 239/533.3
5,394,850 A * 3/1995 Murphy et al. ............... 123/470
5,970,953 A * 10/1999 Lorraine et al. .............. 123/470
6,148,797 A * 11/2000 Gmelin ......................... 123/456
6,263,863 B1 * 7/2001 Giovannini et al. .......... 123/470
6,318,341 B1 * 11/2001 Gmelin et al. ................ 123/470
6,431,151 B1 * 8/2002 Gmelin ......................... 123/470
6,607,149 B2 * 8/2003 Smith et al. ................ 239/585.1
6,684,861 B2 * 2/2004 Reiter ........................... 123/470
6,718,949 B2 * 4/2004 Gmelin ......................... 123/470
6,811,092 B2 * 11/2004 Cowden .......................... 239/89
6,817,547 B2 * 11/2004 Boehland .................. 239/533.2
6,830,034 B2 * 12/2004 Engelmeyer et al. ......... 123/470
7,334,571 B1 * 2/2008 Beardmore et al. .......... 123/470
7,467,618 B2 * 12/2008 Zdroik et al. ................ 123/470

(Continued)

FOREIGN PATENT DOCUMENTS

DE 19937444 C1 * 1/2001
EP 1 255 038 B1 11/2002

(Continued)

*Primary Examiner* — Michael P Ferguson
*Assistant Examiner* — Eric Chau
(74) *Attorney, Agent, or Firm* — King & Spalding L.L.P.

(57) ABSTRACT

A coupling arrangement has a housing, a cylindrical supporting element having a center axis, which at least partly axially overlaps with the housing and contacts it at a first axial end area to disable movement at least in one direction along the center axis, the supporting element has at least a first protrusion, a connecting element with at least a second protrusion, which at least partly axially overlaps with the supporting element and which is arranged along the center axis facing away from the first axial end area, and a spring arranged and designed such that a first and a second axial end rest on the first protrusion and the second protrusion, respectively. The spring, the supporting element with its first protrusion and the connecting element second protrusion are designed and arranged such as to provide an axial force along the center axis at the first axial end area.

13 Claims, 2 Drawing Sheets

U.S. PATENT DOCUMENTS

| | | | | |
|---|---|---|---|---|
| 7,823,564 | B2 * | 11/2010 | Edoardo et al. | 123/470 |
| 2002/0008154 | A1 * | 1/2002 | Straub | 239/5 |
| 2003/0150427 | A1 * | 8/2003 | Liskow | 123/470 |
| 2007/0295309 | A1 * | 12/2007 | Zdroik et al. | 123/470 |

FOREIGN PATENT DOCUMENTS

| | | | |
|---|---|---|---|
| EP | 1255038 | B1 | 9/2004 |
| WO | WO 03054383 | A1 | 7/2003 |

* cited by examiner

COUPLING ARRANGEMENT AND CONNECTION ASSEMBLY

CROSS-REFERENCE TO RELATED APPLICATIONS

This application claims priority to EP Patent Application No. 08000179 filed Jan. 7, 2008, the contents of which is incorporated herein by reference in its entirety.

TECHNICAL FIELD

The invention relates to a coupling arrangement and a connection assembly for coupling a connection body to a connecting element. Furthermore, an axial force may be provided. Such a coupling arrangement and also such a connection assembly may be used in a fluid injection system, in particular for an internal combustion engine.

BACKGROUND

EP1255038B1 discloses a fuel injection system for the direct injection of fuel into at least one combustion space of an internal combustion engine. The fuel injection system has at least one fuel injection valve for each combustion space. The fuel injection valve can be inserted in each case at an injection portion into an assigned receiving board formed on a cylinder head of the internal combustion engine. The injection valve is connected to the pipe via two detents, one between an adapter and a retaining element and another between the retaining element and a connecting element, which is connected to the pipe.

SUMMARY

According to various embodiments, a coupling arrangement and a connection assembly can be created which enable a proper flexible and simple coupling of a connection body to a connecting element and further provide an axial force.

According to an embodiment, a coupling arrangement may comprise a housing, a supporting element being cylindrical having a center axis, which at least partly axially overlaps with the housing and which is in contact with the housing at a first axial end area of the supporting element to disable movement of the housing relative to the supporting element at least in one direction along the center axis, the supporting element comprising at least a first protrusion, a connecting element comprising at least a second protrusion, which at least partly axially overlaps with the supporting element and which is arranged along the center axis of the supporting element facing away from the first axial end area of the supporting element, and a spring being arranged and designed such that a first axial end rests on the first protrusion of the supporting element and a second axial end rests on the second protrusion of the connecting element, wherein the spring, the supporting element with its first protrusion and the second protrusion of the connecting element are designed and arranged such as to provide an axial force along the center axis of the supporting element at the first axial end area of the supporting element.

According to a further embodiment, the housing may comprise a housing area of contact and the supporting element comprises a supporting element area of contact, the housing being in contact with the supporting element at the supporting element area of contact via the housing area of contact, wherein the housing area of contact is tapered and the supporting element area of contact is of graduated circle-shape along a longitudinal section of the supporting element. According to a further embodiment, the housing may comprise a housing area of contact and the supporting element comprises a supporting element area of contact, the housing being in contact with the supporting element at the supporting element area of contact via the housing area of contact, wherein the housing area of contact is at least partly spherical-shaped and at the supporting element area of contact the supporting element has a tapered recess.

According to another embodiment, a connection assembly for connecting an injector to a fluid supply may comprise such a coupling arrangement wherein the housing forms part of the injector, and a pipe, wherein the connecting element is fixed to the pipe of the fluid supply and is arranged such as to communicate with the pipe through a fluid recess at a second axial end area of the connecting element regarding the center axis.

BRIEF DESCRIPTION OF THE DRAWINGS

The invention is explained in the following with the help of schematic drawings.

These are as follows.

Elements with the same design or function that appear in the different illustrations are identified by the same reference characters.

DETAILED DESCRIPTION

Figure 1:
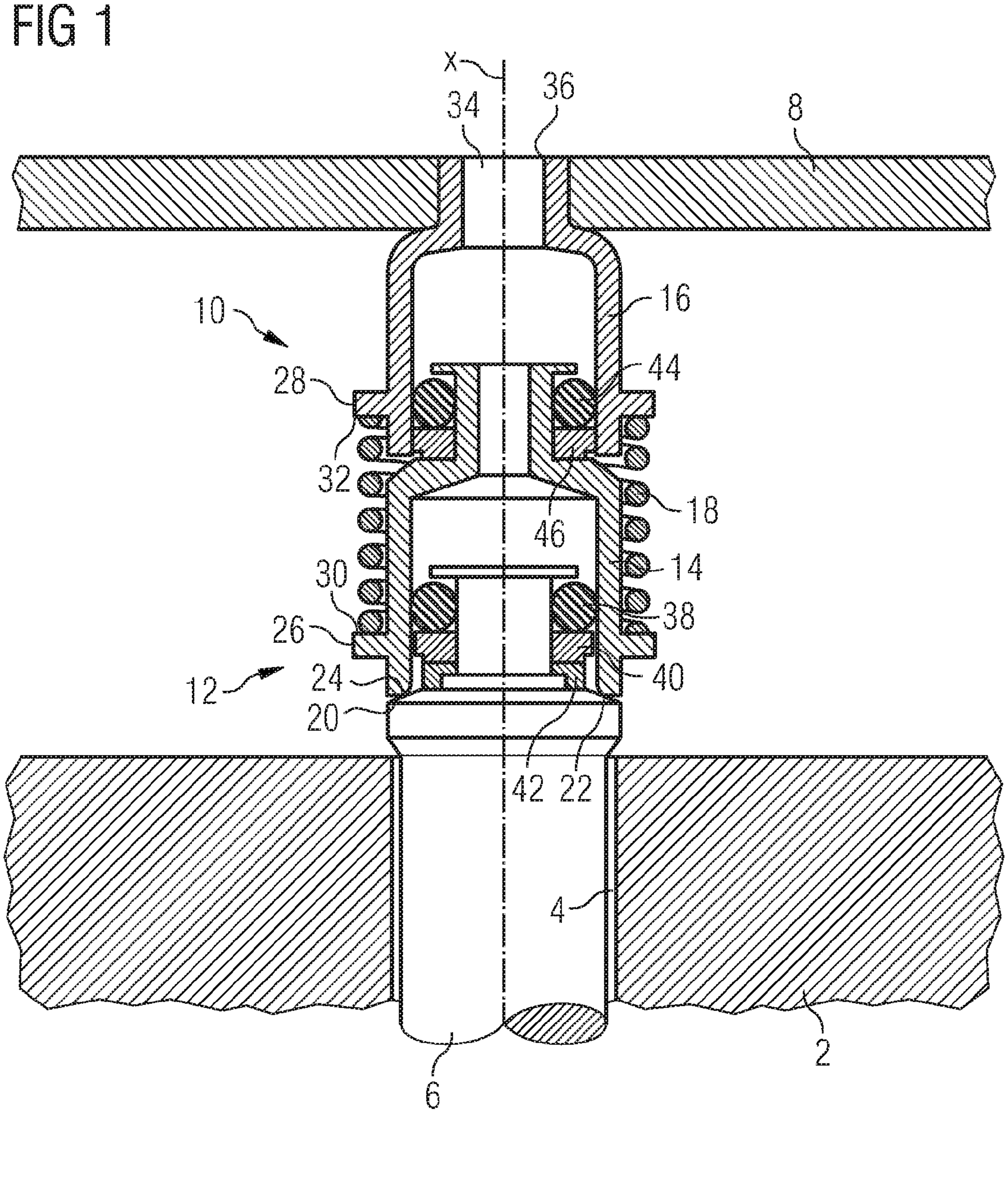
FIG. 1 an exemplary connection assembly with a first embodiment of a coupling arrangement, FIG. 2 part of the first embodiment of the coupling arrangement, FIG. 3 part of a second embodiment of the coupling arrangement, FIG. 4 part of a third embodiment of the coupling arrangement.

According to various embodiments, a coupling arrangement comprises a housing, a supporting element being cylindrical having a center axis, which at least partly axially overlaps with the housing and which is in contact with the housing at a first axial end area of the supporting element to disable movement of the housing relative to the supporting element at least in one direction along the center axis, the supporting element comprising at least a first protrusion, a connecting element comprising at least a second protrusion, which at least partly axially overlaps with the supporting element and which is arranged along the center axis of the supporting element facing away from the first axial end area of the supporting element, and a spring being arranged and designed such that a first axial end rests on the first protrusion of the supporting element and a second axial end rests on the second protrusion of the connecting element. The spring, the supporting element with its first protrusion and the second protrusion of the connecting element are designed and arranged such as to provide an axial force along the center axis of the supporting element at the first axial end area of the supporting element.

In particular, along the contact between the housing and the supporting element the housing is tapered and the supporting element is of graduated circle-shape along a longitudinal section of the supporting element. Therefore, the contact between the supporting element and the housing can disable movement of the housing relative to the supporting element at least in one direction along the center axis, for example in the direction of the center axis facing away from the first axial end area of the supporting element. Thus, the supporting element can be coupled to the housing in a simple way. Furthermore, a simple and low-cost manufacturing of the supporting element is achieved. Such a contact between the housing and the supporting element allows rotational movements of the housing of a connection body. Therewith, the correct alignment between the housing of the connection body and the supporting element can be enabled. Moreover, the supporting element can transmit an axial force along the center axis via the spring on the housing at the first axial end area of the supporting element. For instance, the spring may be a helical spring or a disk spring. For example, if the housing holds an injector, the injector will be pushed in an engine head. Also the correct alignment of the injector to the supporting element may be enabled. Thus, the supporting element and the housing of any connection body enable the coupling of the connection body to the supporting element via the contact between the supporting element and the housing in a very fast and simple way.

In particular, the at least one first protrusion of the supporting element and the at least one second protrusion of the connecting element may be designed and arranged for example each as one circumferentially arranged protrusion or partly circumferentially arranged or more than one partly circumferentially arranged protrusion such as two pins circumferentially arranged at the supporting element and the connecting element respectively. Thereby, an axial force can be transmitted via the supporting element in a very simple way.

In an advantageous embodiment, the housing has a housing area of contact and the supporting element has a supporting element area of contact, the housing is in contact with the supporting element at the supporting element area of contact via the housing area of contact. The housing area of contact is tapered and the supporting element area of contact is of graduated circle-shape along a longitudinal section of the supporting element.

Such a contact between the housing and the supporting element allows rotational movements of the housing of a connection body, for example an injector, regarding its center axis. Therewith, the correct alignment between the housing of the connection body and the supporting element can be enabled. Moreover, the correct alignment between the housing and the supporting element can be accomplished just because of the design by the housing and the supporting element itself without the need for special tools, for example a self-centering arrangement may be provided.

In a further advantageous embodiment, the housing has a housing area of contact and the supporting element has a supporting element area of contact, the housing is in contact with the supporting element at the supporting element area of contact via the housing area of contact. The housing area of contact is at least partly spherical-shaped and at the supporting element area of contact the supporting element has a tapered recess.

Such a contact between the housing and the supporting element allows rotational movements of the housing of a connection body, for example an injector, regarding its center axis. Therewith, the correct alignment between the housing of the connection body and the supporting element can be enabled. Moreover, the correct alignment between the housing and the supporting element can be accomplished just because of the design by the housing and the supporting element itself without the need for special tools, for example a self-centering arrangement may be provided.

According to various further embodiments, a connection assembly for connecting an injector to a fluid supply comprises a coupling arrangement as described above, wherein the housing forms part of the injector, and a pipe, wherein the connecting element is fixed to the pipe of the fluid supply and is arranged such as to communicate with the pipe through a fluid recess at a second axial end area of the connecting element regarding the center axis.

The connection assembly holds the injector via the supporting element in its position respectively in at least one direction of the center axis of the supporting element. At the same time, a rotation of the injector around the center axis of the supporting element is enabled. Thus, the supporting element and the housing of the injector enable the coupling of the injector to the connecting element via the supporting element in a very fast and simple way. Therefore, the injector may be coupled to the fluid supply in a very fast and in a very simple way without the need for special tools. Furthermore, the connection assembly contributes to a proper coupling of the injector to the fluid supply, especially the axial orientation. This may contribute to the proper arrangement of the injector to an engine head.

An engine head 2 (FIG. 1) has a recess 4. A housing 6 of an injector is arranged in the recess 4 of the engine head 2. The housing 6 of the injector is coupled to a pipe 8 of a fluid supply by a connection assembly 10. The connection assembly 10 comprises a coupling arrangement 12.

The coupling arrangement 12 comprises the housing 6, a supporting element 14, a connecting element 16 and a spring 18.

Figure 2:
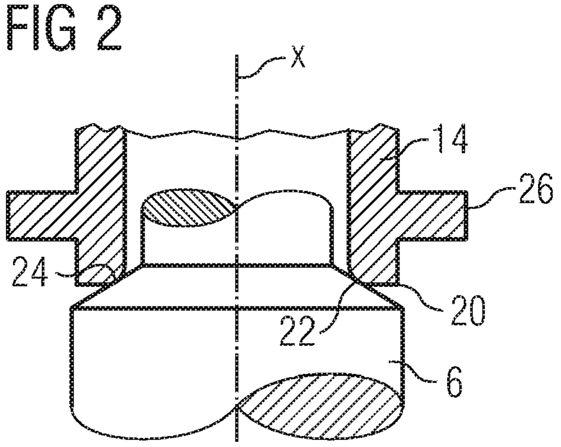

The supporting element 14 being cylindrical having a center axis X partly axially overlaps with the housing 6 and is in contact with the housing 6 at a first axial end area 20 of the supporting element 14. In particular, the housing 6 has a housing area of contact 22 (FIG. 2) and the supporting element 14 has a supporting element area of contact 24, the housing 6 is in contact with the supporting element 14 at the supporting element area of contact 24 via the housing area of contact 22. The housing area of contact 22 is tapered and the supporting element area of contact 24 is of graduated circle-shape along a longitudinal section of the supporting element 14. Such a contact between the supporting element 14 and the housing 6 can disable movement of the housing 6 relative to the supporting element 14 at least in the direction along the center axis X facing away from the first axial end area 20 of the supporting element. Furthermore, the contact allows rotational movements of the housing 6 of the injector regarding the center axis X. Therewith, the correct alignment between the housing 6 of the injector and the connecting element 16 can be enabled. The supporting element 14 comprises a first protrusion 26.

Figure 4:
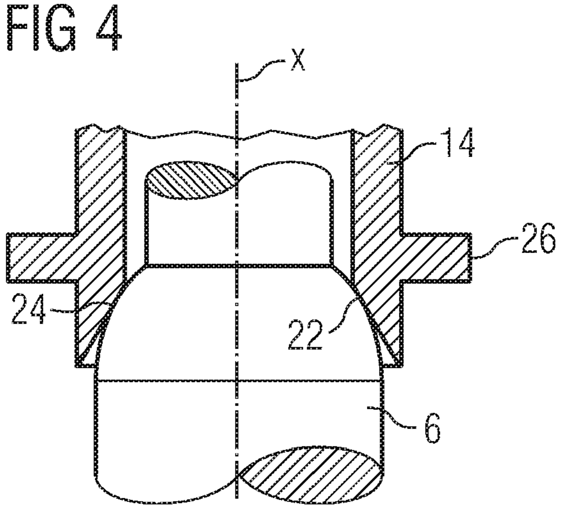

In a further embodiment, the housing area of contact 22 is at least partly spherical-shaped (FIG. 4) and at the supporting element area of contact 24 the supporting element 14 has a tapered recess.

The connecting element 16 partly axially overlaps with the supporting element 14 and is arranged along the center axis X of the supporting element 14 facing away from the first axial end area 20 of the supporting element 14. The connecting element 16 comprises a second protrusion 28.

The spring 18 is arranged and designed such that a first axial end 30 rests on the first protrusion 26 of the supporting element 14 and a second axial end 32 rests on the second protrusion 28 of the connecting element 16. Thereby, the supporting element 14 can transmit an axial force along the center axis X via the spring 18 on the housing 6 at the first axial end area 20 of the supporting element 14. Thus, the injector will be pushed in the engine head 2. For instance, the spring may be a helical spring or a disk spring.

Figure 3:
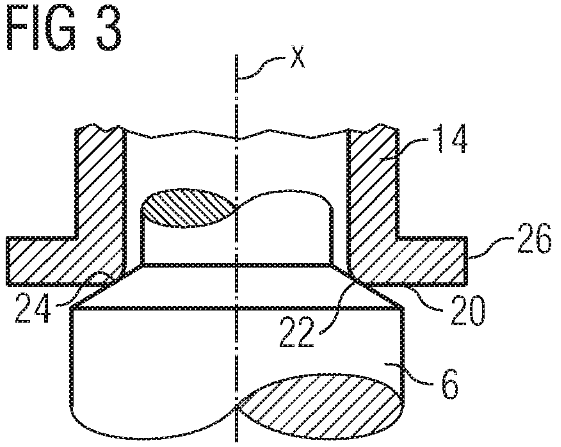

In particular, the at least one first protrusion 26 of the supporting element 14 and the at least one second protrusion 28 of the connecting element 16 may be designed and arranged each as one circumferentially arranged protrusion providing a spring rest. For example, the first protrusion 26 of the supporting element 14 may be arranged at the first axial end area 20 of the supporting element 14 (FIG. 3).

In a further embodiment, the at least one first protrusion 26 of the supporting element 14 and the at least one second protrusion 28 of the connecting element 16 may be designed and arranged each as only partly circumferentially arranged protrusion or more than one partly circumferentially arranged protrusion such as two pins circumferentially arranged at the supporting element 14 and the connecting element 16 respectively.

In the case of a fluid injection system, the connecting element 16 may be a fuel connection. The connecting element 16 communicates with the pipe 8 through a fluid recess 34 at a second axial end area 36 of the connecting element 16.

The connection assembly 10 holds the housing 6 and therewith the injector in its position respectively at least in one direction of the center axis X of the supporting element 14. Furthermore, the connection assembly 10 contributes to a proper coupling of the injector to the fluid supply, especially the axial orientation. This may contribute to the proper arrangement of the injector to the engine head 2.

When the housing 6 of the injector is assembled to the fluid supply, at first the housing 6 of the injector is prearranged in the recess 4 of the engine head 2. Then, the supporting element 14 is arranged to the housing 6 in such a way that the supporting element 14 partly axially overlaps with the housing 6 along the center axis X of the supporting element 14. The spring 18 is arranged such that the first axial end 30 rests on the first protrusion 26 of the supporting element 14. Then, the connecting element 16 is arranged along the center axis X of the supporting element 14 in such a way that the connecting element 16 partly axially overlaps with the supporting element 14 facing away from the first axial end area 20 of the supporting element 14 and the second axial end 32 of the spring 18 rests on the second protrusion 28 of the connecting element 16. To provide the axial force, the spring 18 is compressed between the first protrusion 26 of the supporting element 14 and the second protrusion 28 of the connecting element 16.

Preferably, a first O-ring seal 38 is arranged between the housing 6 of the injector and the supporting element 14, in order to have a proper sealing between the housing 6 of the injector and the supporting element 14. A first back-up ring 40 is arranged between the housing 6 and the supporting element 14 in such a way that the first back-up ring 40 prevents the first O-ring seal 38 to be released from the housing 6. The housing 6 comprises a support 42 to support the placement of the first back-up ring 40 at the housing 6.

Preferably, a second O-ring seal 44 is arranged between the supporting element 14 and the connecting element 16, in order to have a proper sealing between the supporting element 14 and the connecting element 16. A second back-up ring 46 is arranged between the supporting element 14 and the connecting element 16 in such a way that the second back-up ring 46 prevents the second O-ring seal 44 to be released from the supporting element 14.

In this way, the supporting element 14 enables the coupling of the housing 6 of the injector to the connecting element 16. This contributes to a proper coupling of the injector to the fluid supply in a very easy and fast way.

The invention is not restricted to the explained embodiments. For example, the housing area of contact 22 and the supporting element area of contact 24 may comprise alternative shapes. Further, the first protrusion 26 of the supporting element 14 and the second protrusion 28 of the connecting element 16 may comprise alternative shapes.

What is claimed is:

1. A fuel injection assembly comprising:

a fuel injector having a housing with a fluid inlet end;

a pipe of a fluid supply system; and a coupling arrangement comprising a supporting element, a connection element and a spring, wherein the connecting element and the supporting element each comprise a fluid inlet opening at an axial end and a recess with a fluid outlet opening, wherein the fluid inlet opening of the connection element is hydraulically coupled to the pipe, the fluid inlet opening of the supporting element is arranged in the recess of the connection element to provide a sealed connection, and the fluid inlet end of the fuel injector is received in the recess of the supporting element to provide a sealed connection so that the fuel injection assembly defines a sealed passage operable to supply fluid from the pipe to the fuel injector via the connection element and the supporting element, wherein the supporting element, the connecting element, and the fuel injector housing are physically distinct and separate components arranged between, and physically distinct and separate from, an engine head and the pipe, wherein the supporting element is cylindrical having a center axis and is in contact with the housing at a first axial end area of the supporting element so that it is operable to transfer a force to the housing at least in one direction along the center axis, wherein the supporting element comprises at least a first protrusion and the connecting element comprises at least a second protrusion, the spring being arranged and configured such that a first axial end rests on the first protrusion of the supporting element and a second axial end rests on the second protrusion of the connecting element, wherein the spring is compressed between the first protrusion and the second protrusion for providing an axial force along the center axis of the supporting element at the first axial end area of the supporting element, so that the connecting element is operable to bias the fuel injector housing in a first axial direction by means of interaction with the first axial end area of the supporting element for compressing the fuel injector housing against the physically distinct and separate engine head in the first axial direction, and wherein the housing is rotatably coupled with the supporting element at the first axial end area.

2. The fuel injection assembly according to claim 1, wherein the housing comprises a housing contact surface and the supporting element comprises a supporting element contact surface, the housing being in contact with the first axial end area of the supporting element at the supporting element contact surface via the housing contact surface, wherein, to establish the rotatable coupling, the housing contact surface is tapered and the supporting element contact surface is of graduated circle-shape along a longitudinal section of the supporting element.

3. The fuel injection assembly according to claim 1, wherein the housing comprises a housing contact surface and the supporting element comprises a supporting element contact surface, the housing being in contact with the first axial end area of the supporting element at the supporting element contact surface via the housing contact surface, wherein, to establish the rotatable coupling, the housing contact surface is at least partly spherical-shaped and at the supporting element contact surface the supporting element has a tapered recess.

4. The fuel injection assembly according to claim 1, further comprising a first sealing element arranged between the housing and the supporting element.

5. The fuel injection assembly according to claim 4, wherein the first sealing element is an O-ring seal.

6. The fuel injection assembly according to claim 4, further comprising a first back-up ring arranged between the housing and the first sealing element.

7. The fuel injection assembly according to claim 4, further comprising a second sealing element arranged between the supporting element and the connecting element.

8. The fuel injection assembly according to claim 7, wherein the second sealing element is an O-ring seal.

9. The fuel injection assembly according to claim 7, further comprising a second back-up ring arranged between the supporting element and the second sealing element.

10. The fuel injection assembly according to claim 1, wherein the connecting element comprises a cylindrical connection having the fluid inlet opening, wherein the cylindrical connection communicates with a recess in a pipe of a supply line of the fuel supply.

11. A method for coupling an injector with a pipe of a fluid supply comprising the steps of:

providing an injector having a housing with a fluid inlet end, providing a supporting element that is physically separate and distinct from the fuel injector housing, is cylindrical having a center axis, and has a fluid inlet opening, a recess with a fluid outlet opening, and a first protrusion, arranging the fluid inlet end of the housing in the recess of the supporting element to provide a sealed connection and to bring a first axial end area of the supporting element, which first axial end area faces away from the fluid inlet opening of the supporting element, in contact with the housing so that the supporting element is configured to transfer a force to the housing at least in one direction along the center axis, arranging a spring such that a first axial end rests on the first protrusion of the supporting element, providing a connecting element comprising at least a second protrusion, a fluid inlet opening, and a recess with a fluid outlet opening, positioning the connection element to arrange the fluid inlet opening of the supporting element in the recess of the connecting element to provide a sealed connection and bring a second axial end of the spring in contact with the second protrusion of the connecting element, the first protrusion and the second protrusion compressing the spring to provide an axial force along the center axis of the supporting element at the first axial end area of the supporting element such that the connecting element biases the housing in a first axial direction via interaction with the first axial end area to compress the housing against an engine head; and fixing the connecting element to a pipe of the fluid supply such as to communicate with the pipe through a fluid recess at a second axial end area of the connecting element regarding the center axis, wherein the supporting element, the connecting element, and the fuel injector housing are(a) physically distinct and separate components arranged between, and physically distinct and separate from, the engine head and the pipe, and (b) define a sealed passage for supplying fluid from the pipe to the fuel injector via the connection element and the supporting element, and wherein the housing is rotatably coupled with the supporting element at the first axial end area.

12. The method according to claim 11, wherein the housing comprises a housing contact surface and the supporting element comprises a supporting element contact surface, wherein the housing is brought in contact with the supporting element at the supporting element contact surface via the housing contact surface, and wherein, for establishing the rotatable coupling, the housing contact surface is tapered and the supporting element contact surface is of graduated circle-shape along a longitudinal section of the supporting element.

13. The method according to claim 11, wherein the housing comprises a housing contact surface and the supporting element comprises a supporting element contact surface, wherein the housing is brought in contact with the supporting element at the supporting element contact surface via the housing contact surface, and wherein, for establishing the rotatable coupling, the housing contact surface is at least partly spherical-shaped and at the supporting element contact surface the supporting element has a tapered recess.

* * * * *